(12) United States Patent
Zou et al.

(10) Patent No.: US 12,547,834 B2
(45) Date of Patent: Feb. 10, 2026

(54) METHOD AND APPARATUS FOR TEXT ANALYSIS, ELECTRONIC DEVICE AND COMPUTER READABLE STORAGE MEDIUM

(71) Applicant: BEIJING YOUZHUJU NETWORK TECHNOLOGY CO., LTD., Beijing (CN)

(72) Inventors: Yuxiang Zou, Beijing (CN); Zejun Ma, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 204 days.

(21) Appl. No.: 18/469,461

(22) Filed: Sep. 18, 2023

(65) Prior Publication Data

US 2024/0095451 A1 Mar. 21, 2024

(30) Foreign Application Priority Data

Sep. 19, 2022 (CN) .......................... 202211136640.6

(51) Int. Cl.
*G06F 40/284* (2020.01)
*G06F 40/263* (2020.01)
*G10L 13/10* (2013.01)

(52) U.S. Cl.
CPC .......... *G06F 40/284* (2020.01); *G06F 40/263* (2020.01); *G10L 13/10* (2013.01)

(58) Field of Classification Search
CPC .................................................... G06F 40/284
USPC ............................................................ 704/9
See application file for complete search history.

(56) References Cited

U.S. PATENT DOCUMENTS

| | | | | |
|---|---|---|---|---|
| 10,388,270 | B2* | 8/2019 | Golipour | G10L 13/10 |
| 11,645,447 | B2* | 5/2023 | Yerebakan | G06F 40/126 |
| | | | | 715/200 |
| 11,809,820 | B2* | 11/2023 | Saito | G06F 40/295 |
| 2005/0216267 | A1* | 9/2005 | Kustner | G10L 13/08 |
| | | | | 704/260 |
| 2016/0125872 | A1* | 5/2016 | Golipour | G10L 13/10 |
| | | | | 704/260 |

(Continued)

FOREIGN PATENT DOCUMENTS

WO  WO-2023228313 A1 * 11/2023 ............. G10L 15/16

OTHER PUBLICATIONS

P. Zhang, "A Numerical Fact Extraction Method for Chinese Text," 2022 IEEE 7th International Conference on Smart Cloud (SmartCloud), Shanghai, China, 2022, pp. 97-103, doi: 10.1109/SmartCloud55982. 2022.00021.keywords: {Deep learning;Analytical models;Annotations;Design methodology;Feature extraction (Year: 2022).*

*Primary Examiner* — Bharatkumar S Shah
(74) *Attorney, Agent, or Firm* — Alleman Hall LLP

(57) ABSTRACT

Provided are an electronic device and a computer readable storage medium. The method includes: acquiring a text to be analyzed; performing token conversion on words in the text to be analyzed to obtain a token sequence to be analyzed, where tokens in token sequences to be analyzed corresponding to texts to be analyzed in different languages belong to a same type; and performing feature extraction on the token sequence to be analyzed, and processing a target task based on the extracted feature, to determine an analysis result for the text to be analyzed.

20 Claims, 3 Drawing Sheets

(56) References Cited

U.S. PATENT DOCUMENTS

2018/0293228 A1\* 10/2018 Tarakji ................. G06F 40/295
2019/0272325 A1\* 9/2019 Korn ....................... G10L 13/08
2022/0237391 A1\* 7/2022 Zhang .................. G06F 40/284

\* cited by examiner

METHOD AND APPARATUS FOR TEXT ANALYSIS, ELECTRONIC DEVICE AND COMPUTER READABLE STORAGE MEDIUM

CROSS-REFERENCE TO RELATED APPLICATIONS

This application claims priority to Chinese application NO. 202211136640.6, titled "METHOD AND APPARATUS FOR TEXT ANALYSIS, ELECTRONIC DEVICE AND COMPUTER READABLE STORAGE MEDIUM", filed Sep. 19, 2022, with the China National Intellectual Property Administration, which is incorporated herein by reference in its entirety.

FIELD

The present disclosure relates to the technical field of computer processing, and in particular to a method and an apparatus for text analysis, an electronic device and a computer readable storage medium.

BACKGROUND

For speech synthesis, a text is to be analyzed first, and then the speech synthesis is performed by using an analysis result. A process of text analysis is called a speech synthesis front-end. In case of multi-language, for purpose of launching the speech synthesis online, a set of speech synthesis front-ends for each of the languages is required to be built online, thus occupying more online resources.

SUMMARY

In view of this, a method and an apparatus for text analysis, an electronic device and a computer readable storage medium are provided according to embodiments of the present disclosure.

In a first aspect, a method for text analysis is provided according to an embodiment of the present disclosure. The method includes:
  acquiring a text to be analyzed;
  performing token conversion on words in the text to be analyzed to obtain a token sequence to be analyzed, where tokens in token sequences to be analyzed corresponding to texts to be analyzed in different languages belong to a same type; and
  performing feature extraction on the token sequence to be analyzed, and processing a target task based on the extracted feature, to determine an analysis result for the text to be analyzed.

In a second aspect, an apparatus for text analysis is provided according to an embodiment of the present disclosure. The apparatus includes an acquisition module, a conversion module and an analysis module.

The acquisition module is configured to acquire a text to be analyzed.

The conversion module is configured to perform token conversion on words in the text to be analyzed to obtain a token sequence to be analyzed, where tokens in token sequences to be analyzed corresponding to texts to be analyzed in different languages belong to a same type.

The analysis module is configured to perform feature extraction on the token sequence to be analyzed, and process a target task based on the extracted feature, to determine an analysis result for the text to be analyzed.

In a third aspect, an electronic device is provided according to an embodiment of the present disclosure. The electronic device includes a memory and a processor. The memory and the processor are in communication with each other. The memory stores computer instructions. The processor is configured to, when executing the computer instructions, implement the method for text analysis according to the first aspect or any one of embodiments in the first aspect.

In a fourth aspect, a computer readable storage medium storing computer instructions is provided according to an embodiment of the present disclosure. The computer instructions are configured to cause a computer to implement the method for text analysis according to the first aspect or any one of embodiments in the first aspect.

BRIEF DESCRIPTION OF THE DRAWINGS

In order to more clearly illustrate the technical solutions in the specific embodiments of the present disclosure or in the conventional technology, the drawings used in the description of the specific embodiments or the conventional technology will be briefly introduced hereinafter. Apparently, the drawings described hereafter illustrate some embodiments of the present disclosure. Other drawings can be obtained by those skilled in the art based on these drawings without any creative efforts.

DETAILED DESCRIPTION OF EMBODIMENTS

Figure 1:
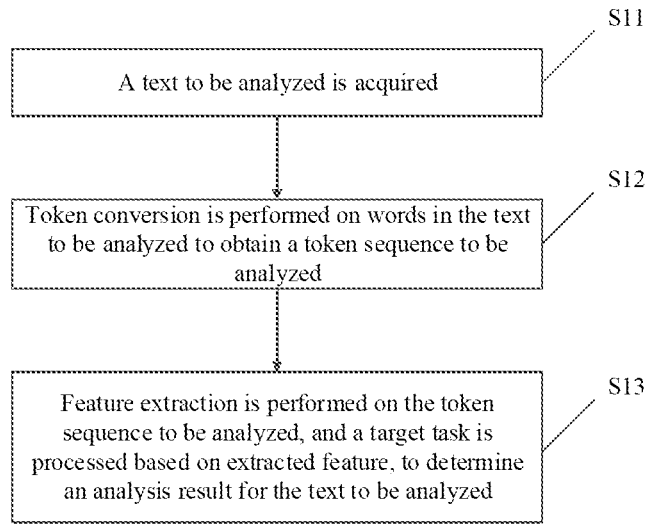
FIG. 1 is a flowchart of a method for text analysis according to an embodiment of the present disclosure.

In order to make the objective, technical solutions and advantages of the embodiments of the present disclosure clearer, the technical solutions in the embodiments of the present disclosure are described clearly and completely in conjunction with the drawings of the embodiments of the present disclosure hereinafter. It is apparent that the described embodiments are only some rather than all embodiments of the present disclosure. All the other embodiments obtained by those skilled in the art based on the embodiments of the present disclosure without any creative effort shall fall within the protection scope of the present disclosure.

In the field of speech synthesis, an analysis result obtained by analyzing a text includes but is not limited to parts-of-speech of words in the text and prosodies. The parts-of-speech include noun, pronoun, verb, adjective, adverb, preposition, conjunction, interjection and the like. The prosodies include continuity, word boundary, prosodic word boundary, prosodic phrase boundary, intonation phrase boundary and the like. After obtaining the analysis result, an electronic device may synthesize and output a speech by combining with phonemes corresponding to the words in the text, thus converting the text into speech.

Speech synthesis inevitably involves multilingual speech synthesis. In order to achieve the multilingual speech synthesis, in a stage of the text analysis, speech synthesis front-ends corresponding to each of the languages are usually deployed. In this way, if a product needs to support speech synthesis of N languages, speech synthesis front-ends corresponding to the N languages are required to be deployed in the product, which inevitably results in increased resources occupied by the speech synthesis.

Based on this, in a method for text analysis according to an embodiment of the present disclosure, firstly, token conversion is performed on a text to be analyzed to obtain a token sequence to be analyzed. Then, the token sequence to be analyzed is analyzed to obtain an analysis result. In this way, influence of languages may be eliminated by using token conversion, and texts to be analyzed in different languages are converted into token sequences to be analyzed represented by tokens of a same type. Since the token sequences to be analyzed are represented by tokens of the same type, it is not necessary to distinguish different languages for a specific method for processing a token sequence to be analyzed, and only a same processing logic is required. Based on this, when the method for text analysis is applied to a product, it is not needed to deploy ways for text analysis corresponding to different languages, and a speech synthesis front-end applicable for different languages may be implemented by using the method for text analysis according to the embodiment of the present disclosure.

Further, in text analysis, a variety of analysis results are usually required to be obtained. For example, parts-of-speech and prosodies are required to be obtained. An pipeline operation is often adopted. That is, task analysis modules are respectively deployed for analysis tasks of each of the languages, resulting in a long workflow and multiple task analysis modules to be deployed online.

Based on this, in a method for text analysis according to an embodiment of the present disclosure, at least one type of target task processing unit is set in parallel in a same target analysis model. The efficiency for text analysis is improved through parallel processing of multiple tasks.

In some embodiments, the target analysis model is obtained based on a pre-trained feature extraction unit and at least one preset task processing unit. The pre-trained feature extraction unit is obtained by pre-training through unsupervised texts, so that the feature extraction unit can learn language information common to different languages, and the target analysis model can predict texts in different languages when being used in analysis. Based on this, the target analysis model has an ability of zero-shot learning, and can perform text analysis and predict on a new language without labels. The new language here refers to a language other than a preset language used for training the target analysis model. That is, the new language is not used for training the target analysis model.

A method for text analysis is provided according to an embodiment of the present disclosure. It should be noted that steps shown in the flowcharts may be performed by a computer system by executing a set of computer executable instructions. Although a logical order is shown in the flowcharts, the steps shown or described may, in some circumstances, be performed in an order different from that described herein.

In an embodiment, a method for text analysis is provided, which is applicable to an electronic device, such as a computer, a tablet computer and a speech device. FIG. 1 is a flowchart of a method for text analysis according to an embodiment of the present disclosure. As shown in FIG. 1, the method includes the following steps S11 to S13.

In S11, a text to be analyzed is acquired.

The text to be analyzed may be input into the electronic device by an interaction between a user and the electronic device, or may be stored in the electronic device, or may be obtained from other devices by the electronic device through a communication connection with other devices. Here, a way for the electronic device to obtain the text to be analyzed is not limited, and may be configured according to actual needs. A language representation of the text to be analyzed is not limited, and may be, for example, Chinese, English, Spanish and German.

In S12, token conversion is performed on words in the text to be analyzed to obtain a token sequence to be analyzed.

Tokens in token sequences to be analyzed corresponding to texts to be analyzed in different languages belong to a same type.

After acquiring the text to be analyzed, the electronic device first determines words in the text to be analyzed, then performs token mapping on the words to obtain tokens corresponding thereto, and then splices the obtained tokens according to an order of the words in the text to be analyzed to obtain a token sequence to be analyzed. It should be noted that a word in the text to be analyzed refer to a smallest independent unit in the text to be analyzed, for example, a Chinese character or an English word. The electronic device may divide the words in the text to be analyzed based on a language form of the text to be analyzed. For example, for the English language family, spaces between words may be used for division.

If the text to be analyzed is Chinese sentence of "今日天气晴朗", the words in the text to be analyzed are: Chinese characters of 今, 日, 天, 气, 晴, 朗. If the text to be analyzed is English sentence of "It is sunny today", the words in the text to be analyzed are the English words of "it", "is", "sunny" and "today".

For texts to be analyzed in different languages, tokens in token sequences to be analyzed obtained after the token conversion are all of a same type. For example, the tokens may be numbers, and a token sequence to be analyzed may be obtained by using different combinations of numbers.

The electronic device may be a terminal device used by the user or a server. In a case that the electronic device is the terminal device, the terminal device maintains a mapping relationship between words and tokens. After determining the words in the text to be analyzed, the terminal device may determine tokens corresponding to the words by querying the mapping relationship, thus obtaining the token sequence to be analyzed. In a case that the electronic device is the server, the server is connected with the terminal device, and once obtaining the text to be analyzed which is uploaded by the terminal device, the server performs token conversion by using the mapping relationship between words and tokens to obtain the token sequence to be analyzed.

As mentioned above, after the token conversion is performed on the texts to be analyzed in different languages, token sequences to be analyzed, which are represented by tokens of the same type, are obtained. Based on this, the electronic device converts the texts to be analyzed in different languages into tokens of the same type, thus eliminating the limitation of different languages. For subsequent processing steps, it is only required to focus on processing of the token sequence represented by tokens of the same type, without distinguishing different languages.

This step will be described in detail below.

In S13, feature extraction is performed on the token sequence to be analyzed, and a target task is processed based on an extracted feature, to determine an analysis result for the text to be analyzed.

The electronic device may perform feature extraction on the token sequence to be analyzed by using a feature extraction model such as an ELECTRA model, a BERT model, or the like. The ELECTRA model is called Efficiently Learning an Encoder that Classifies Token Replacements Accurately. The BERT model is called Bidirectional Encoder Representations from Transformer. Here, a specific model adopted is not limited, and may be configured according to actual needs, as long as the feature extraction model takes a token sequence as input and outputs feature(s) of the token sequence.

After extracting the feature(s) of the token sequence to be analyzed, the electronic device processes target task(s) based on the extracted feature(s). There may be one, two or more target tasks, the specific number of which is not limited here. In a case that there are two or more target tasks, the target tasks may be processed in parallel or be processed separately in turn, or in other manner. For example, the electronic device analyzes part-of-speech by using the extracted feature(s) to obtain the part-of-speech of each word.

This step will be described in detail below.

In a method for text analysis according to an embodiment, texts to be analyzed in different languages are converted into token sequences to be analyzed which are represented by tokens of a same type, so that differences between the languages are eliminated before feature extraction. Thus, both feature extraction and target task processing are language-independent. Subsequently, when launching the method for text analysis online, separate deployment for each of the languages is not required, and texts in different languages may be processed by using the same method for text analysis, which saves online resources.

Figure 2:
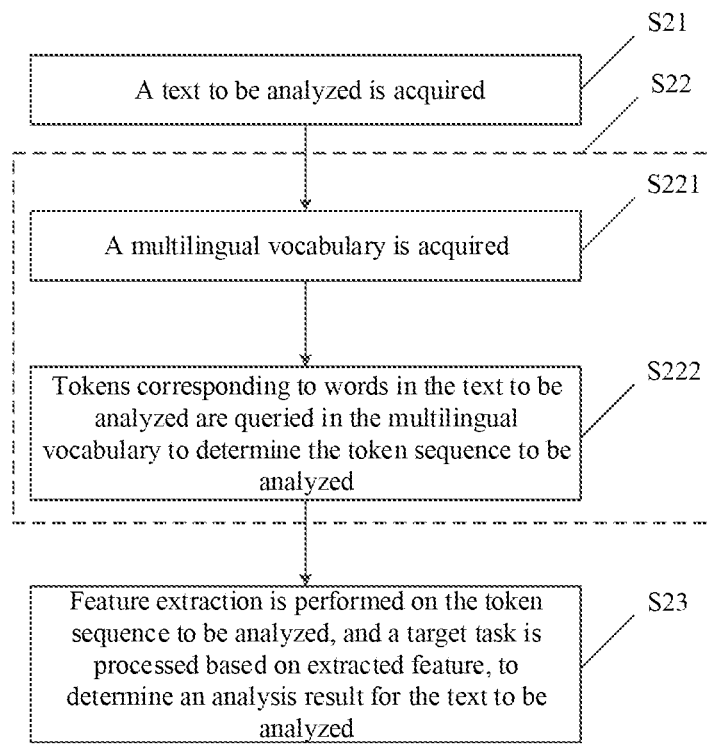
FIG. 2 is a flowchart of a method for text analysis according to an embodiment of the present disclosure.

In an embodiment, a method for text analysis is provided, which is applicable to an electronic device, such as a computer, a tablet computer and a speech device. FIG. 2 is a flowchart of a method for text analysis according to an embodiment of the present disclosure. As shown in FIG. 2, the method includes the following steps S21 to S23.

In S21, a text to be analyzed is acquired.

For details, reference may be made to S11 in the embodiment shown in FIG. 1, which is not repeated here.

In S22, token conversion is performed on words in the text to be analyzed to obtain a token sequence to be analyzed.

Tokens in token sequences to be analyzed corresponding to texts to be analyzed in different languages belong to a same type.

In an embodiment, S22 includes the following steps S221 to S222.

In S221, a multilingual vocabulary is acquired.

The multilingual vocabulary is used to represent a mapping relationship between words in multiple languages and tokens.

The multilingual vocabulary includes words in N languages. For all languages, since words in the multilingual vocabulary may only be enumerative rather than exhaustive, the multilingual vocabulary covers common words in the N languages. For example, when constructing the multilingual vocabulary, serial numbers from 1 to N1 represent language 1, serial numbers N1+1 to N2 represent language 2, and the like, to obtain serial numbers corresponding to all languages.

A serial number in each serial number interval is an token, which indicates an token of a word at a position where the serial number is located.

In S222, tokens corresponding to words in the text to be analyzed are queried in the multilingual vocabulary to determine the token sequence to be analyzed.

For each of the words in the text to be analyzed, the electronic device queries the word in the multilingual vocabulary, to determine an token corresponding to the word. By traversing all the words in the text to be analyzed, the electronic device determines tokens corresponding to all the words, and then splices the tokens based on an arrangement order of the words in the text to be analyzed, to obtain the token sequence to be analyzed.

Since the number of words included in the multilingual vocabulary is limited, there may be the case that an token corresponding to a certain word cannot be found in the multilingual vocabulary. That is, there is no query result. In this case, the electronic device divides the word into sub-words. That is, in some embodiments, S222 includes the following steps.

(1) The token corresponding to each of the words in the text to be analyzed is queried in the multilingual vocabulary.

(2) in a case that there is no query result for a word, the word is divided into sub-words, and tokens corresponding to the sub-words are queried in the multilingual vocabulary, to determine the token sequence to be analyzed.

The multilingual vocabulary includes not only tokens corresponding to common words, but also tokens corresponding to common sub-words. For example, for "bedroom", in a case that there is no query result for "bedroom" in the multilingual vocabulary, the electronic device divides "bedroom" into a sub-word "bed" and a sub-word "room", and then queries tokens corresponding to "bed" and "room" in the multilingual vocabulary.

For example, for "sunny", in a case that there is no query result for "sunny" in the multilingual vocabulary, the electronic device divides "sunny" into a sub-word "sun" and a sub-word "ny", and then queries tokens corresponding to "sun" and "ny" in the multilingual vocabulary. Based on this, sub-words included in the multilingual vocabulary may further include some common prefixes, suffixes and so on.

In a case that an token corresponding to a certain word may not be found in the multilingual vocabulary, the word is divided into sub-words, so that the token sequence to be analyzed may be obtained.

In S23, feature extraction is performed on the token sequence to be analyzed, and a target task is processed based on the extracted feature, to determine an analysis result for the text to be analyzed.

For details, reference may be made to S13 in the embodiment shown in FIG. 1, which is not repeated here.

In a method for text analysis according to an embodiment, by deploying a multilingual vocabulary, a token sequence to be analyzed may be determined by directly querying in the multilingual vocabulary during token conversion, thus improving the efficiency of token conversion.

Figure 3:
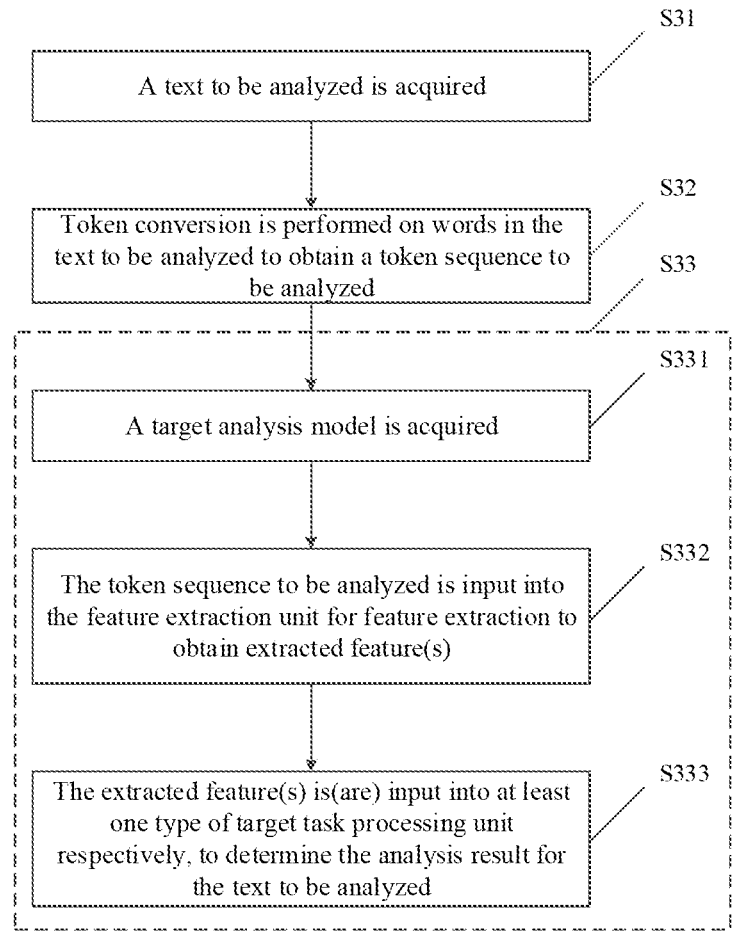
FIG. 3 is a flowchart of a method for text analysis according to an embodiment of the present disclosure.

In an embodiment, a method for text analysis is provided, which is applicable to an electronic device, such as a computer, a tablet computer and a speech device. FIG. 3 is a flowchart of a method for text analysis according to an embodiment of the present disclosure. As shown in FIG. 3, the method includes the following steps S31 to S33.

In S31, a text to be analyzed is acquired.

For details, reference may be made to S11 in the embodiment shown in FIG. 1, which is not repeated here.

In S32, token conversion is performed on words in the text to be analyzed to obtain a token sequence to be analyzed.

Tokens in token sequences to be analyzed corresponding to texts to be analyzed in different languages belong to a same type.

For details, reference may be made to S22 in the embodiment shown in FIG. 2, which is not repeated here.

In S33, feature extraction is performed on the token sequence to be analyzed, and a target task is processed based on the extracted feature, to determine an analysis result for the text to be analyzed.

In an embodiment, S33 includes the following steps S331 to S333.

In S331, a target analysis model is acquired.

The target analysis model is obtained by analyzing a sample token sequence for at least one preset language, and the target analysis model includes a feature extraction unit and at least one type of target task processing unit.

Figure 4:
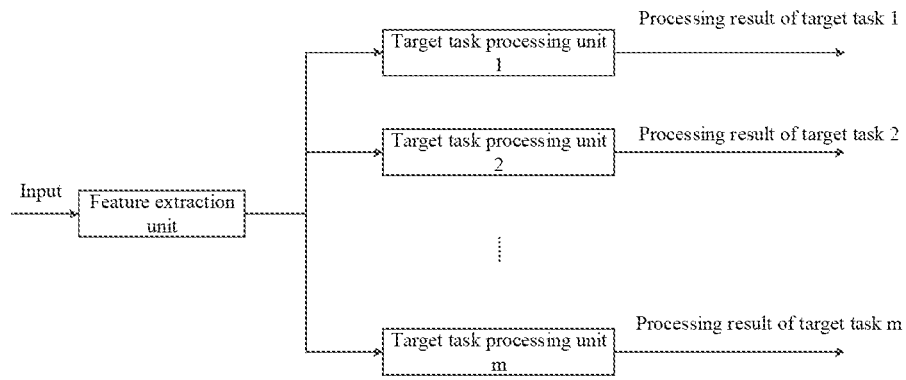
FIG. 4 is a schematic structural diagram of a target analysis model according to an embodiment of the present disclosure.

FIG. 4 shows a structure of a target analysis model. The target analysis model includes a feature extraction unit and target task processing unit(s). FIG. 4 shows m target task processing units, i.e., target task processing unit 1 to target task processing unit m. Of course, FIG. 4 is only exemplary and does not constitute limitation on a specific structure of the target analysis model in the embodiment of the present disclosure, and the number of m may be determined according to actual needs. Each type of the target task processing units have a corresponding processing result. That is, an output of the target analysis model includes a processing result of target task 1 to a processing result of target task m.

The feature extraction unit is configured to perform feature extraction on an input token sequence. The target task processing unit is configured to process a target task with the extracted feature, for example, to predict part-of-speech or to predict prosodic boundary.

The target analysis model may be pre-trained and deployed in the electronic device, or may be trained by the electronic device when it is to perform text analysis. A source of the target analysis model is not limited here. The preset language is within a range of languages included in the multilingual vocabulary, and the sample token sequence is obtained through token conversion of a text in at least one preset language by using the multilingual vocabulary.

In some embodiments, S331 includes the following steps.

(1) A preset analysis model is acquired, where the preset analysis model includes a pre-trained feature extraction unit and at least one preset task processing unit.

The pre-trained feature extraction unit is trained by using token sequences corresponding to a large number of unsupervised texts in multiple languages, and labels are not required to be used during training. Alternatively, already-published pre-trained feature extraction unit may be directly used. The number and types of preset task processing units may be configured according to actual needs. The preset task processing unit may be constructed based on a classification model. Initial parameter(s) in the preset task processing unit may be set based on empirical values or may be set randomly.

(2) The sample token sequence in the at least one preset language and a task label corresponding to the sample token sequence are acquired.

As mentioned above, the preset language belongs to the languages included in the multilingual vocabulary. For example, texts in ten preset languages are collected, and token conversion is performed on words of texts in the preset languages by using the multilingual vocabulary to obtain sample token sequences for the preset languages. Contents included in task labels corresponding to sample token sequences are set based on a target task. If the target task includes part-of-speech and prosody, the task labels include part-of-speech labels and prosodic labels. The part-of-speech labels include part-of-speech labels of each of the words in the texts, and the prosodic labels include labels of prosody types in the texts.

For example, the part-of-speech labels include noun, pronoun, verb, adjective, adverb, preposition, conjunction, interjection and the like. The prosodic discontinuity labels include: 0 (continuous reading), 1 (word boundary), 2 (prosodic word boundary), 3 (prosodic phrase boundary) and 4 (intonation phrase boundary).

The task labels may be manually annotated. For example, by considering auditory perception, waveform, frequency spectrum, and semantic information obtained from the text, an annotator annotates prosodic discontinuity features for lesser-known language phonetic database data, to ultimately form parallel data of "text-prosodic label-audio", and part-of-speech related data is downloaded from open source data on the Internet, thus ultimately forming the task labels.

(3) The sample token sequence is input into the preset analysis model to determine a prediction result corresponding to each of preset task processing units.

The electronic device inputs the acquired sample token sequence into the preset analysis model, and uses the preset analysis model to perform feature extraction and target task processing, to obtain a prediction result corresponding to each of preset task processing units.

(4) A loss function is calculated based on the prediction result and the task label to update parameters of the pre-trained feature extraction unit and parameters of the at least one preset task processing unit, to determine the target analysis model.

For each preset task processing unit, a category with a highest probability is determined as a prediction result of the preset task processing unit. At the same time, for each preset task processing unit, each category has a certain probability. The electronic device calculates a loss function based on the prediction result and the corresponding task label, determines a difference between the prediction result and the corresponding task label, and whereby updates parameters of the pre-trained feature extraction unit and parameters of the at least one preset task processing unit. After several iterations and updates, the target analysis model is determined.

By pre-training through unsupervised texts in multiple languages, common language information may be learned, and a single model may be used to predict texts in different languages. In the preset analysis model, the pre-trained feature extraction unit is used for training. Since different languages have prosodic structures of certain similarities, by unsupervised pre-training, the pre-trained feature extraction unit may learn a cross-language ability of a multi-language pre-training model. This is because different languages have common words, unified and similar grammatical structure may be learned, and deep semantic features at sentence level may be captured, so that expressions of synonymous sentences are close in space.

In some embodiments, step (4) in S331 includes the following steps.

4.1) For each of target tasks, a prediction category corresponding to the target task in the prediction result is acquired.

4.2) A first loss function is calculated based on the prediction category and a target category corresponding to a preset task, to determine a first loss.
4.3) Candidate prediction categories in the target task are acquired, where the prediction category is one of the candidate prediction categories.
4.4) A second loss function is calculated based on the candidate prediction categories to determine a second loss.
4.5) The parameters of the pre-trained feature extraction unit and parameters of the at least one preset task processing unit are updated based on the first loss and the second loss, to determine the target analysis model.

As mentioned above, the electronic device determines the category with the highest probability in the prediction result of each of the target tasks as the prediction category corresponding to the target task. For example, the preset analysis model includes two preset task processing units, which correspond to two target tasks. For each of the target tasks, after being processed by a corresponding preset task processing unit, a category with a highest probability is determined as a prediction category corresponding to the target task. Then, the electronic device calculate a first loss function based on a task label corresponding to the target task and the prediction category, to determine a first loss. The first loss is a fusion of calculation results of first loss functions corresponding to all target tasks, which may be a weighted sum, an average value and so on.

For the target tasks, after being processed by the preset task processing units, candidate prediction categories are obtained, where the prediction category is a category with a largest probability value in the candidate prediction categories. For the candidate prediction categories of the preset task processing units, second loss functions are calculated respectively, calculation results of second loss functions of a same preset task processing unit are fused, and then fusion results of all preset task processing units are fused again to determine a second loss. A specific calculation methods of the first loss function and the second loss function may be configured according to actual needs. For example, a cross entropy loss function may be used for calculation.

Two kinds of losses are used for training. One is to calculate a loss of a task, and the other is to calculate losses of different categories in a same task, to balance an output of a network of different tasks.

As an alternative implementation of the embodiment, step 4.4) includes the following steps.
4.4.1) A quantity of each of candidate prediction categories is counted.
4.4.2) A loss value of each candidate prediction category is determined based on the quantity, where the loss value is negatively correlated with the quantity; and
4.4.3) The second loss is determined based on loss values of all the candidate prediction categories.

For different candidate prediction categories, the quantity of each of candidate prediction categories is counted first, and then a negatively correlated loss value is determined based on the quantity, so that loss values of all the candidate prediction categories are of a same order of magnitude. This is because a proportion of each category in data is extremely unbalanced. Therefore, calculating losses of different candidate prediction categories for a same target task may balance an output of each category.

In some embodiments, the loss function in this stage is a sum of weighted cross entropy loss functions of a prediction label sequence and a real label sequence of each of the target tasks. There are two rounds of weighting here. The first weighting is to weight each of the target tasks and give different weights to different tasks to balance an output of a network of different tasks. The second weighting is to weight different categories in the task, for example, categories of parts-of-speech and categories of prosodies. For each of the target tasks, different weights will be given to different candidate prediction categories. That is, smaller weights will be given to candidate prediction categories with larger quantities, and larger weights will be given to candidate prediction categories with smaller quantities. This is because proportions of each candidate prediction category in data is extremely unbalanced, and using the weighted cross entropy loss function is beneficial to balancing an output of each category.

In S332, the token sequence to be analyzed is input into the feature extraction unit for feature extraction, to obtain extracted feature.

In S333, the extracted feature is input into at least one type of target task processing unit respectively, to determine the analysis result for the text to be analyzed.

The feature extraction unit performs feature extraction on the input token sequence to be analyzed, to obtain the extracted feature(s). Then, the extracted feature(s) is(are) input into at least one type of target task processing unit respectively, and at least one target task is processed in parallel by the at least one type of target task processing unit to obtain the analysis result for the text to be analyzed.

In some embodiments, the text to be analyzed is in a language other than the preset language, the multilingual vocabulary includes the language of the text to be analyzed, and the multilingual vocabulary is used to represent a mapping relationship between words in multiple languages and tokens. The preset language is a language corresponding to the sample token sequence used to train the preset analysis model. For example, there are 100 languages in the multilingual vocabulary, and only 20 of them are used in training the preset analysis model. The language of the text to be analyzed is not involved in the training of the preset analysis model. That is, the language of the text to be analyzed is new to the trained preset analysis model, but the language of the text to be analyzed is included in the multilingual vocabulary.

Since the target analysis model is a cross-language model, it may be used to analyze texts to be analyzed in new languages without labeled data, where the new languages refer to languages other than the preset language.

In a method for text analysis according to an embodiment, a text to be analyzed is analyzed by using a target analysis model including at least one type of target task processing unit, to process at least one target task in parallel, which improves the analysis efficiency, and may be implemented only by using one target analysis model without deploying multiple analysis models, thus further reducing the occupied online resources.

As an alternative implementation of the embodiment, after obtaining the analysis result for the text to be analyzed, the electronic device may perform speech synthesis based on the analysis result, to synthesize the text to be analyzed into a speech for output. The target task includes predicting prosodic boundary. Based on this, the method further includes the following steps.
(1) A phoneme sequence corresponding to the text to be analyzed is acquired.
(2) Speech synthesis is performed based on the phoneme sequence and predicted prosodic boundaries to determine a target speech.

The phoneme sequence corresponding to the text to be analyzed is determined by querying in a phoneme table to obtain phonemes corresponding to each of the words in the text to be analyzed. On the basis of the phoneme sequence, combined with the predicted prosodic boundaries, speech synthesis is performed to obtain the target speech.

Based on the prediction result of the target task, speech may be synthesized through the phoneme sequence and the predicted prosodic boundaries. For online products, since token sequences to be analyzed of a same type are obtained by token conversion, differences between the languages are eliminated. Thus, in subsequent speech synthesis processing, there is no need to perform separate speech synthesis deployment for each of the languages.

In some embodiments, the target task further includes part-of-speech prediction. Based on this, the above step (2) includes: in a case that the text to be analyzed includes a polyphonic word, determining a phoneme of the polyphonic word based on part-of-speech of the polyphonic word, to determine the phoneme sequence corresponding to the text to be analyzed. In an embodiment, after the part-of-speech of a polyphonic word is predicted, a pronunciation corresponding to the part-of-speech is selected from a pronunciation table of polyphonic words, and a task of disambiguating the polyphonic word is completed to obtain a phoneme sequence of the polyphonic word. Upon inputting the phoneme sequence of the text, combined with prosodic boundary features, for a speech synthesis model, speech with certain prosodic rhythm and prosodic naturalness may be synthesized, in which the pronunciation of polyphonic word is correct, and prosodic pause is appropriate.

For a polyphonic word, a phoneme of the polyphonic word is determined by using the predicted part-of-speech, to ensure the accuracy of the phoneme of the polyphonic word, thus improving the accuracy of the phoneme sequence corresponding to the text to be analyzed.

As a specific application example of the embodiment, an electronic device is a mobile phone, and a user inputs a text to be analyzed on a display interface of the mobile phone through an interaction with the mobile phone. The mobile phone performs token conversion on the text to be analyzed by using a multilingual vocabulary, to obtain a token sequence to be analyzed. Then, a target analysis model is used to process the token sequence to be analyzed, and a part-of-speech sequence and a prosodic boundary sequence corresponding to the token sequence to be analyzed are output. If there is a polyphonic word in the text to be analyzed, a phoneme of the polyphonic word is determined based on part-of-speech of the polyphonic word, to determine the phoneme sequence corresponding to the text to be analyzed. Then, the phoneme sequence and the prosodic boundary sequence are used for speech synthesis. Finally, a target speech corresponding to the text to be analyzed is output.

As another specific application example of the embodiment, an electronic device is a reading machine, a user determines a text to be analyzed by finger clicking, the reading machine collects the text to be analyzed, and performs token conversion on the text to be analyzed by using a multilingual vocabulary, to obtain a token sequence to be analyzed. Then, a target analysis model is used to process the token sequence to be analyzed, and a part-of-speech sequence and a prosodic boundary sequence corresponding to the token sequence to be analyzed are output. If there is a polyphonic word in the text to be analyzed, a phoneme of the polyphonic word is determined based on part-of-speech of the polyphonic word, to determine a phoneme sequence corresponding to the text to be analyzed. Then, the phoneme sequence and the prosodic boundary sequence are used for speech synthesis. Finally, a target speech corresponding to the text to be analyzed is output.

In an embodiment, an apparatus for text analysis is further provided. The apparatus is used to implement the above embodiments and preferred implementations, and the description above is not repeated here. A term "module" used hereafter may be a combination of software and/or hardware that may implement a predetermined function. Though an apparatus described in the following embodiments is preferably implemented by software, the apparatus may also be implemented by hardware or a combination of software and hardware.

Figure 5:
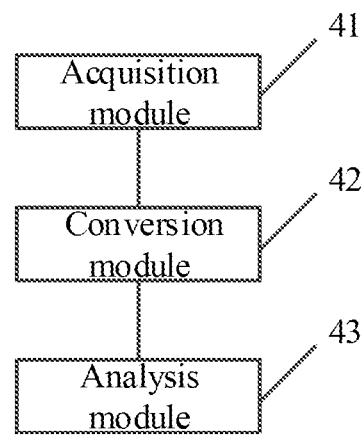
FIG. 5 is a structural block diagram of an apparatus for text analysis according to an embodiment of the present disclosure.

In an embodiment, an apparatus for text analysis is provided. As shown in FIG. 5, the apparatus includes an acquisition module 41, a conversion module 42 and an analysis module 43.

The acquisition module 41 is configured to acquire a text to be analyzed.

The conversion module 42 is configured to perform token conversion on words in the text to be analyzed to obtain a token sequence to be analyzed, where tokens in token sequences to be analyzed corresponding to texts to be analyzed in different languages belong to a same type.

The analysis module 43 is configured to perform feature extraction on the token sequence to be analyzed, and process a target task based on extracted feature, to determine an analysis result for the text to be analyzed.

In some embodiments, the conversion module 42 includes a first acquisition unit and a first determination unit.

The first acquisition unit is configured to acquire a multilingual vocabulary, where the multilingual vocabulary is used to represent a mapping relationship between words in multiple languages and tokens.

The first determination unit is configured to query in the multilingual vocabulary for tokens corresponding to words in the text to be analyzed, to determine the token sequence to be analyzed.

In some embodiments, the first determination unit includes a query subunit and a division subunit.

The query subunit is configured to query in the multilingual vocabulary for the tokens corresponding to the words in the text to be analyzed.

The division subunit is configured to: in a case that there is no query result for a word, divide the word into subwords, and query in the multilingual vocabulary for tokens corresponding to the sub-words, to determine the token sequence to be analyzed.

In some embodiments, the analysis module 43 includes a second acquisition unit, a first input unit and a second input unit.

The second acquisition unit is configured to acquire a target analysis model, where the target analysis model is obtained by analyzing a sample token sequence in at least one preset language, and the target analysis model includes a feature extraction unit and at least one type of target task processing unit.

The first input unit is configured to input the token sequence to be analyzed into the feature extraction unit for feature extraction, to obtain extracted feature.

The second input unit is configured to input the extracted feature into the at least one type of target task processing unit respectively, to determine the analysis result for the text to be analyzed.

In some embodiments, the second acquisition unit includes a first acquisition subunit, a second acquisition subunit, a prediction subunit and a first calculation subunit.

The first acquisition subunit is configured to acquire a preset analysis model, where the preset analysis model includes a pre-trained feature extraction unit and at least one preset task processing unit.

The second acquisition subunit is configured to acquire the sample token sequence in the at least one preset language and a task label corresponding to the sample token sequence.

The prediction subunit is configured to input the sample token sequence into the preset analysis model to determine a prediction result corresponding to each of preset task processing units.

The first calculation subunit is configured to calculate a loss function based on the prediction result and the task label to update parameters of the pre-trained feature extraction unit and parameters of the at least one preset task processing unit, to determine the target analysis model.

In some embodiments, the first calculation subunit includes a third acquisition subunit, a second calculation subunit, a fourth acquisition subunit, a third calculation subunit and an update subunit.

The third acquisition subunit is configured to: for each of target tasks, acquire a prediction category corresponding to the target task in the prediction result.

The second calculation subunit is configured to calculate a first loss function based on the prediction category and a target category corresponding to a preset task, to determine a first loss.

The fourth acquisition subunit is configured to acquire candidate prediction categories in the target task, wherein the prediction category is one of the candidate prediction categories.

The third calculation subunit is configured to calculate a second loss function based on the candidate prediction categories to determine a second loss.

The update subunit is configured to update the parameters of the pre-trained feature extraction unit and parameters of the at least one preset task processing unit based on the first loss and the second loss, to determine the target analysis model.

In some embodiments, the third calculation subunit includes a statistical subunit, a first determination subunit and a second determination subunit.

The statistical subunit is configured to: count a quantity of each of candidate prediction categories.

The first determination subunit is configured to determine a loss value of each candidate prediction category based on the quantity, where the loss value is negatively correlated with the quantity.

The second determination subunit is configured to determine the second loss based on loss values of all the candidate prediction categories.

In some embodiments, the text to be analyzed is in a language other than the preset language, a multilingual vocabulary includes the language of the text to be analyzed, and the multilingual vocabulary is used to represent a mapping relationship between words in multiple languages and tokens.

In some embodiments, the target task includes prosodic boundary prediction, and the apparatus further includes a phoneme sequence acquisition module and a speech synthesis module.

The phoneme sequence acquisition module is configured to acquire a phoneme sequence corresponding to the text to be analyzed.

The speech synthesis module is configured to perform speech synthesis based on the phoneme sequence and predicted prosodic boundaries, to determine a target speech.

In some embodiments, the target task further includes part-of-speech prediction, and the phoneme sequence acquisition module includes a phoneme determination unit.

The phoneme determination unit is configured to: in a case that the text to be analyzed includes a polyphonic word, determine a phoneme of the polyphonic word based on part-of-speech of the polyphonic word, to determine the phoneme sequence corresponding to the text to be analyzed.

The apparatus for text analysis according to the embodiment is presented in a form of functional units. Here, the units refer to ASIC circuits, processors and memories that execute one or more software or fixed programs, and/or other devices that may provide the above functions.

Description of further functions of the modules is the same as that of the above embodiments, which is not repeated here.

An electronic device is further provided according to an embodiment of the present disclosure. The electronic device includes the apparatus for text analysis shown in FIG. 5.

Figure 6:
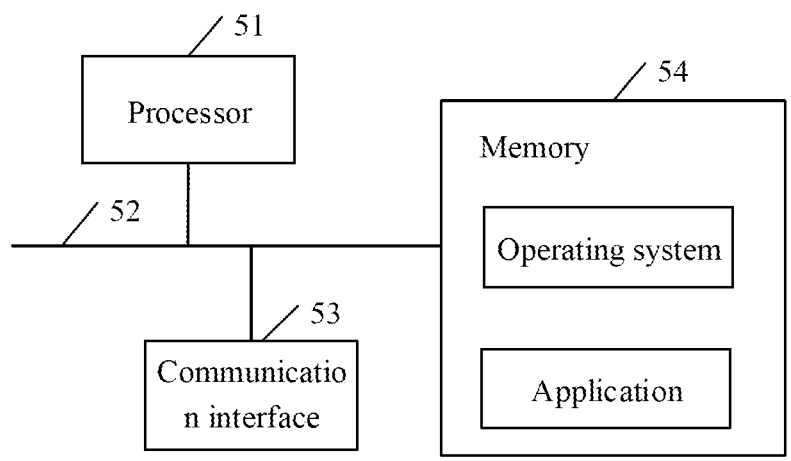
FIG. 6 is a schematic diagram of a hardware structure of an electronic device according to an embodiment of the present disclosure.

Reference may be made to FIG. 6, which is a schematic structural diagram of an electronic device according to an alternative embodiment of the present disclosure. As shown in FIG. 6, the electronic device may include at least one processor 51, such as Central Processing Unit (CPU), at least one communication interface 53, a memory 54 and at least one communication bus 52. The communication bus 52 is configured to realize connection and communication among these components. The communication interface 53 may include a display and a keyboard. Alternatively, the communication interface 53 may further include a standard wired interface and a wireless interface. The memory 54 may be a high speed Random Access Memory (RAM) memory or a non-volatile memory, such as at least one disk memory. The memory 54 may alternatively be at least one storage apparatus located far away from the processor 51. The processor 51 may be combined with the apparatus described in FIG. 5, the memory 54 is configured to store an application, and the processor 51 calls program code stored in the memory 54 to execute any of the above method steps.

The communication bus 52 may be a peripheral component interconnect (PCI) bus or an extended industry standard architecture (EISA) bus. The communication bus 52 may be divided into an address bus, a data bus, a control bus and the like. For ease of representation, the bus is shown in FIG. 6 as one thick line, which does not imply that there is only one bus or the bus is of a single type.

The memory 54 may include a volatile memory, such as a random-access memory (RAM). The memory may further include a non-volatile memory, such as a flash memory, a hard disk drive (HDD) or a solid-state drive (SSD). The memory 54 may further include a combination of the above memories.

The processor 51 may be a central processing unit (CPU), a network processor (NP) or a combination of CPU and NP.

The processor 51 may further include a hardware chip. The hardware chip may be an application-specific integrated circuit (ASIC), a programmable logic device (PLD) or a combination thereof. The PLD may be a complex programmable logic device (CPLD), a field-programmable gate array (FPGA), a generic array logic (GAL) or any combination thereof.

Optionally, the memory 54 is further configured to store program instructions. The processor 51 may call the program instructions to implement the method for text analysis as shown in any embodiment of the present disclosure.

A non-transitory computer storage medium is further provided according to an embodiment of the present disclosure. The computer storage medium stores computer executable instructions which may execute the method for text analysis in any of the method embodiments. The storage medium may be a magnetic disk, an optical disk, a Read-Only Memory (ROM), a Random Access Memory (RAM), a Flash Memory, a Hard Disk Drive (HDD) or a Solid-State Drive (SSD). The storage medium may further include a combination of the above memories.

The embodiments in this specification are described in a progressive manner, the same and similar parts between embodiments may be referred to each other, and each embodiment focuses on the differences from other embodiments. Since the system embodiment is similar to the method embodiment, the description for the system embodiment is relatively simple. For related parts, reference may be made to description in the method embodiment.

It can be understood that in the specific implementations of the present disclosure, relevant data such as user information and a text to be analyzed are involved. In a case that the embodiments of the present disclosure are applied to specific products or technologies, user permission or consent is required, and the collection, use, and processing of relevant data must comply with relevant laws, regulations, and standards of relevant countries and regions.

Although the embodiments of the present disclosure have been described in connection with the drawings, those skilled in the art can make various modifications and variations without departing from the spirit and scope of the present disclosure, and such modifications and variations are all within the scope defined by the appended claims.

The invention claimed is:

1. A method for text analysis, comprising:
acquiring a text comprising words originating from different languages;
performing token conversion on every word in the text in a language-independent manner, to obtain a token sequence; and
performing feature extraction on the token sequence, and processing a target task based on an extracted feature, to determine an analysis result for the text.

2. The method according to claim 1, wherein the performing token conversion on every word in the text in the language-independent manner to obtain the token sequence comprises:
acquiring a multilingual vocabulary, wherein the multilingual vocabulary is used to represent a mapping relationship between words in a plurality of languages and tokens;
querying, in the multilingual vocabulary, for tokens corresponding to the words in the text, to determine the token sequence.

3. The method according to claim 2, wherein the querying, in the multilingual vocabulary, for tokens corresponding to the words in the text, to determine the token sequence comprises:
querying, in the multilingual vocabulary, for tokens corresponding to the words in the text; and
in a case that there is no query result for a word, dividing the word into sub-words, and querying, in the multilingual vocabulary, for tokens corresponding to the sub-words, to determine the token sequence.

4. The method according to claim 1, wherein the performing feature extraction on the token sequence, and processing the target task based on the extracted feature, to determine an analysis result for the text comprises:
acquiring a target analysis model, wherein the target analysis model is obtained by analyzing a sample token sequence in at least one preset language, and the target analysis model comprises a feature extraction unit and at least one type of target task processing unit;
inputting the token sequence into the feature extraction unit for feature extraction, to obtain the extracted feature; and
inputting the extracted feature into the at least one type of target task processing unit respectively, to determine the analysis result for the text.

5. The method according to claim 4, wherein the acquiring the target analysis model comprises:
acquiring a preset analysis model, wherein the preset analysis model comprises a pre-trained feature extraction unit and at least one preset task processing unit;
acquiring the sample token sequence in the at least one preset language and a task label corresponding to the sample token sequence;
inputting the sample token sequence into the preset analysis model to determine a prediction result corresponding to each of preset task processing units; and
calculating a loss function based on the prediction result and the task label to update parameters of the pre-trained feature extraction unit and parameters of the at least one preset task processing unit, to determine the target analysis model.

6. The method according to claim 5, wherein the calculating the loss function based on the prediction result and the task label to update parameters of the pre-trained feature extraction unit and parameters of the at least one preset task processing unit, to determine the target analysis model comprises:
for each of target tasks, acquiring a prediction category corresponding to the target task in the prediction result;
calculating a first loss function based on the prediction category and a target category corresponding to a preset task, to determine a first loss;
acquiring candidate prediction categories in the target task, wherein the prediction category is one of the candidate prediction categories;
calculating a second loss function based on the candidate prediction categories to determine a second loss; and
updating the parameters of the pre-trained feature extraction unit and the parameters of the at least one preset task processing unit based on the first loss and the second loss, to determine the target analysis model.

7. The method according to claim 6, wherein the calculating the second loss function based on the candidate prediction categories to determine the second loss comprises:
counting a quantity of each of candidate prediction categories;
determining a loss value of each candidate prediction category based on the quantity, wherein the loss value is negatively correlated with the quantity; and
determining the second loss based on loss values of all the candidate prediction categories.

8. The method according to claim 4, wherein the text is in a language other than the preset language, a multilingual vocabulary comprises the language of the text, and the multilingual vocabulary is used to represent a mapping relationship between words in a plurality of languages and tokens.

9. The method according to claim 1, wherein the target task comprises prosodic boundary prediction, and the method further comprises:
- acquiring a phoneme sequence corresponding to the text; and
- performing speech synthesis based on the phoneme sequence and predicted prosodic boundaries, to determine a target speech.

10. The method according to claim 9, wherein the target task further comprises part-of-speech prediction, and the acquiring a phoneme sequence corresponding to the text comprises:
- in a case that the text comprises a polyphonic word, determining a phoneme of the polyphonic word based on part-of-speech of the polyphonic word, to determine the phoneme sequence corresponding to the text.

11. An electronic device, comprising:
a memory and a processor, wherein the memory and the processor are in communication with each other, the memory stores computer instructions, and the processor is configured to, when executing the computer instructions, implement:
- acquiring a text comprising words originating from different languages;
- performing token conversion on every word in the text in a language-independent manner, to obtain a token sequence; and
- performing feature extraction on the token sequence, and processing a target task based on extracted feature, to determine an analysis result for the text.

12. The electronic device according to claim 11, wherein the processor is further configured to implement:
- acquiring a multilingual vocabulary, wherein the multilingual vocabulary is used to represent a mapping relationship between words in a plurality of languages and tokens;
- querying, in the multilingual vocabulary, for tokens corresponding to the words in the text, to determine the token sequence.

13. The electronic device according to claim 12, wherein the processor is further configured to implement:
- querying, in the multilingual vocabulary, for tokens corresponding to the words in the text; and
- in a case that there is no query result for a word, dividing the word into sub-words, and querying, in the multilingual vocabulary, for tokens corresponding to the sub-words, to determine the token sequence.

14. The electronic device according to claim 11, wherein the processor is further configured to implement:
- acquiring a target analysis model, wherein the target analysis model is obtained by analyzing a sample token sequence in at least one preset language, and the target analysis model comprises a feature extraction unit and at least one type of target task processing unit;
- inputting the token sequence into the feature extraction unit for feature extraction, to obtain the extracted feature; and
- inputting the extracted feature into the at least one type of target task processing unit respectively, to determine the analysis result for the text.

15. The electronic device according to claim 14, wherein the processor is further configured to implement:
- acquiring a preset analysis model, wherein the preset analysis model comprises a pre-trained feature extraction unit and at least one preset task processing unit;
- acquiring the sample token sequence in the at least one preset language and a task label corresponding to the sample token sequence;
- inputting the sample token sequence into the preset analysis model to determine a prediction result corresponding to each of preset task processing units; and
- calculating a loss function based on the prediction result and the task label to update parameters of the pre-trained feature extraction unit and parameters of the at least one preset task processing unit, to determine the target analysis model.

16. The electronic device according to claim 15, wherein the processor is further configured to implement:
- for each of target tasks, acquiring a prediction category corresponding to the target task in the prediction result;
- calculating a first loss function based on the prediction category and a target category corresponding to a preset task, to determine a first loss;
- acquiring candidate prediction categories in the target task, wherein the prediction category is one of the candidate prediction categories;
- calculating a second loss function based on the candidate prediction categories to determine a second loss; and
- updating the parameters of the pre-trained feature extraction unit and the parameters of the at least one preset task processing unit based on the first loss and the second loss, to determine the target analysis model.

17. The electronic device according to claim 16, wherein the processor is further configured to implement:
- counting a quantity of each of candidate prediction categories;
- determining a loss value of each candidate prediction category based on the quantity, wherein the loss value is negatively correlated with the quantity; and
- determining the second loss based on loss values of all the candidate prediction categories.

18. The electronic device according to claim 14, wherein the text is in a language other than the preset language, a multilingual vocabulary comprises the language of the text, and the multilingual vocabulary is used to represent a mapping relationship between words in a plurality of languages and tokens.

19. The electronic device according to claim 11, wherein the target task comprises prosodic boundary prediction, wherein the processor is further configured to implement:
- acquiring a phoneme sequence corresponding to the text; and
- performing speech synthesis based on the phoneme sequence and predicted prosodic boundaries, to determine a target speech.

20. A non-transitory computer readable storage medium having computer instructions stored thereon, wherein the computer instructions are configured to cause a computer to implement:
- acquiring a text comprising words originating from different languages;
- performing token conversion on every word in the text in a language-independent manner, to obtain a token sequence; and
- performing feature extraction on the token sequence, and processing a target task based on extracted feature, to determine an analysis result for the text.

* * * * *